United States Patent
Tetsuka

(10) Patent No.: US 9,423,310 B2
(45) Date of Patent: Aug. 23, 2016

(54) BICYCLE CRANK ARM WITH SENSOR SYSTEM

(71) Applicant: Shimano Inc., Sakai, Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 282 days.

(21) Appl. No.: 14/193,976

(22) Filed: Feb. 28, 2014

(65) Prior Publication Data

US 2015/0247767 A1  Sep. 3, 2015

(51) Int. Cl.
*G01L 1/04* (2006.01)
*G01L 1/22* (2006.01)
*G01L 1/00* (2006.01)
*G01L 1/26* (2006.01)
*G01L 5/04* (2006.01)

(52) U.S. Cl.
CPC .................................. *G01L 1/22* (2013.01)

(58) Field of Classification Search
None
See application file for complete search history.

(56) References Cited

U.S. PATENT DOCUMENTS

| | | | |
|---|---|---|---|
| 5,027,303 A | | 6/1991 | Witte |
| 7,806,006 B2 * | | 10/2010 | Phillips ................. G01L 3/1457 280/259 |
| 7,861,599 B2 | | 1/2011 | Meggiolan |
| 8,006,574 B2 | | 8/2011 | Meyer |
| 8,065,926 B2 | | 11/2011 | Meyer |
| 8,689,645 B2 * | | 4/2014 | Watarai ................... B62M 3/00 73/862.381 |
| 8,800,389 B2 * | | 8/2014 | Tetsuka ................... B62M 3/00 73/862 |
| 8,833,182 B2 * | | 9/2014 | Tetsuka ................. B62M 3/003 73/862.621 |
| 8,961,191 B2 * | | 2/2015 | Hanshew .............. H01R 39/64 439/21 |
| 9,322,725 B2 * | | 4/2016 | Tetsuka .................. G01L 3/247 |
| 2005/0178210 A1 | | 8/2005 | Lanham |
| 2010/0263468 A1 * | | 10/2010 | Fisher ..................... G01L 5/225 74/469 |
| 2012/0017701 A1 | | 1/2012 | Meyer |
| 2012/0330572 A1 * | | 12/2012 | Longman ............... G01L 3/247 702/44 |
| 2013/0205945 A1 * | | 8/2013 | Hosaka .................... B62M 6/50 74/594.2 |
| 2013/0233092 A1 | | 9/2013 | Tetsuka et al. |
| 2013/0333489 A1 * | | 12/2013 | David ..................... G01L 1/044 73/862.641 |

FOREIGN PATENT DOCUMENTS

| | | |
|---|---|---|
| JP | 3047816 U | 2/1998 |
| WO | 2009/006673 A1 | 1/2009 |
| WO | 2011/030215 A1 | 3/2011 |

OTHER PUBLICATIONS

U.S. Appl. No. 13/959,418, filed Aug. 5, 2013, Tetsuka et al. (unpublished).

* cited by examiner

*Primary Examiner* — Michael A Lyons
*Assistant Examiner* — Jermaine Jenkins
(74) *Attorney, Agent, or Firm* — Global IP Counselors

(57) ABSTRACT

A crank arm is provided that includes a crank body, a sensor support member and at least one sensor. The crank body has an axle mounting portion. The sensor support member is member attached to the crank body, and has an axle support portion that is configured to support an axle. The at least one strain sensor is disposed on the sensor support member.

22 Claims, 8 Drawing Sheets

BICYCLE CRANK ARM WITH SENSOR SYSTEM

BACKGROUND

1. Field of the Invention

This invention generally relates to a crank arm for a bicycle including a stationary bicycle or a bicycle fitting device. More specifically, the present invention relates to a crank arm with a sensor support member and a sensor that detects pedaling force.

2. Background Information

Bicycles and bicycle fitting device are sometimes equipped with various sensors for providing information to the rider/user and/or for providing information to a controller to control various aspects of the bicycle or bicycle fitting device such as shifting, suspension stiffness or assisting with a motor. One such sensor is a torque or force sensor for detecting the pedaling force of the rider. Various sensing arrangements have been proposed for detecting a pedaling force of the rider. For example, in U.S. Pat. No. 7,516,677 (assigned to Shimano Inc.), a cylindrical torsion-detecting sleeve member (force sensor unit) is provided on a crank axle for detecting a pedaling force applied to the crank axle during pedaling. Another example of a force sensor for detecting a pedaling force applied to a crank arm is disclosed in Japanese Utility Model Patent No. 3047816 (see FIGS. 3 and 4). In this utility model patent, a torque sensor is used to detect a relative resistance between a flexible rod and a crank arm. The crank arm and the flexible rod are rotatable around a crank axle via a one-way clutch bearing. A free end of the flexible rod contacts a portion of the crank arm.

More recently, strain gauges have been used to detect the pedaling force during pedaling. For example, a force sensor is disclosed in U.S. Patent Application Publication No. 2010/0282001 (assigned to Shimano Inc.), which utilizes a strain gauge for detecting a pedaling force applied to a crank axle during pedaling. Another example is disclosed in U.S. Pat. No. 8,006,574 where a strain gauge is used on a crank arm to detect a pedaling force by a rider. Typically, the strain gauge needs to be installed with a high accuracy to obtain accurate measurements. Thus, the manufacturing costs and/or manufacturing time in manufacturing a crank arm increases when a strain gauge is installed thereon to detect a pedaling force by a rider/user.

SUMMARY

Generally, the present disclosure is directed to a crank arm that is provided with a sensing arrangement that detects a pedaling force or power being applied on the crank arm of a bicycle or bicycle fitting device.

In accordance with a first aspect of the inventions, a crank arm is provided that includes a crank body, a sensor support member and at least one sensor. The crank body has an axle mounting portion. The sensor support member is member attached to the crank body, and has an axle support portion that is configured to support an axle. The at least one strain sensor is disposed on the sensor support member.

In accordance with a second aspect of the present invention, the crank arm according to the first aspect is configured so that the axle support portion is configured to support a pedal axle as the axle.

In accordance with a third aspect of the present invention, the crank arm according to the first aspect is configured so that the axle support portion is configured to be fixedly coupled to the axle.

In accordance with a fourth aspect of the present invention, the crank arm according to the first aspect is configured so that the axle support portion of the sensor support member includes a threaded hole In accordance with a fifth aspect of the present invention, the crank arm according to the fourth aspect is configured so that the threaded hole is disposed on a first end part of the sensor support member.

In accordance with a sixth aspect of the present invention, the crank arm according to the fourth aspect is configured so that the crank body has a pedal attachment bore through which a pedal axle is configured to be disposed as the axle.

In accordance with a seventh aspect of the present invention, the crank arm according to the sixth aspect is configured so that the pedal attachment bore of the crank body is concentrically arranged relative to the threaded hole of the sensor support member.

In accordance with an eighth aspect of the present invention, the crank arm according to the first aspect is configured so that the sensor support member is configured to deform upon a pedaling force being applied to the axle support portion.

In accordance with a ninth aspect of the present invention, the crank arm according to the first aspect is configured so that the sensor support member is fixedly attached to the crank body such that the sensor support member is either press-fitted or bonded to the crank body.

In accordance with a tenth aspect of the present invention, the crank arm according to the first aspect is configured so that the crank body has a cavity, and the sensor support member is disposed within the cavity of the crank body.

In accordance with an eleventh aspect of the present invention, the crank arm according to the tenth aspect is configured so that the crank body has an access bore that communicates with the cavity of the crank body, the access bore being dimensioned with respect to the sensor support member such that the sensor support member is installed into the cavity via the access bore.

In accordance with a twelfth aspect of the present invention, the crank arm according to the eleventh aspect is configured so that the access bore is disposed on an end surface of the crank body.

In accordance with a thirteenth aspect of the present invention, the crank arm according to the twelfth aspect is configured so that the sensor support member extends to the axle mounting portion of the crank body.

In accordance with a fourteenth aspect of the present invention, the crank arm according to the first aspect is configured so that the sensor support member has first and second end parts, the axle support portion being disposed on the first end part of the sensor support member, the second end part of the sensor support member being fixedly coupled to the crank body.

In accordance with a fifteenth aspect of the present invention, the crank arm according to the first aspect is configured so that the second end part of the sensor support member is fixedly coupled to the crank body by a bolt.

In accordance with a sixteenth aspect of the present invention, the crank arm according to the first aspect is configured so that the strain sensor includes a plurality of sensor elements disposed at different locations on the sensor support member.

In accordance with a seventeenth aspect of the present invention, the crank arm according to the sixteenth aspect is configured so that the sensor elements are arranged on side surfaces of the sensor support member.

In accordance with an eighteenth aspect of the present invention, the crank arm according to the sixteenth aspect is configured so that the sensor elements are formed of at least one of a strain gauge and semiconductor sensor for detection of strain.

In accordance with a nineteenth aspect of the present invention, the crank arm according to the first aspect is configured so that an electric amplifier disposed on the sensor support member and operatively connected to the strain sensor to amplify a signal from the strain sensor.

In accordance with a twentieth aspect of the present invention, the crank arm according to the nineteenth aspect is configured so that the electric amplifier is electrically connected to the strain sensor via at least one of an electric wire and a flexible print circuit.

In accordance with a twenty-first aspect of the present invention, the crank arm according to the first aspect is configured so that the axle support portion is configured to support a crank axle as the axle.

In accordance with a twenty-second aspect of the present invention, the crank arm according to the second aspect is configured so that the axle support portion is configured to further support a crank axle as another axle.

Additional inventive features, objects, aspects and advantages of the disclosed crank arm will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
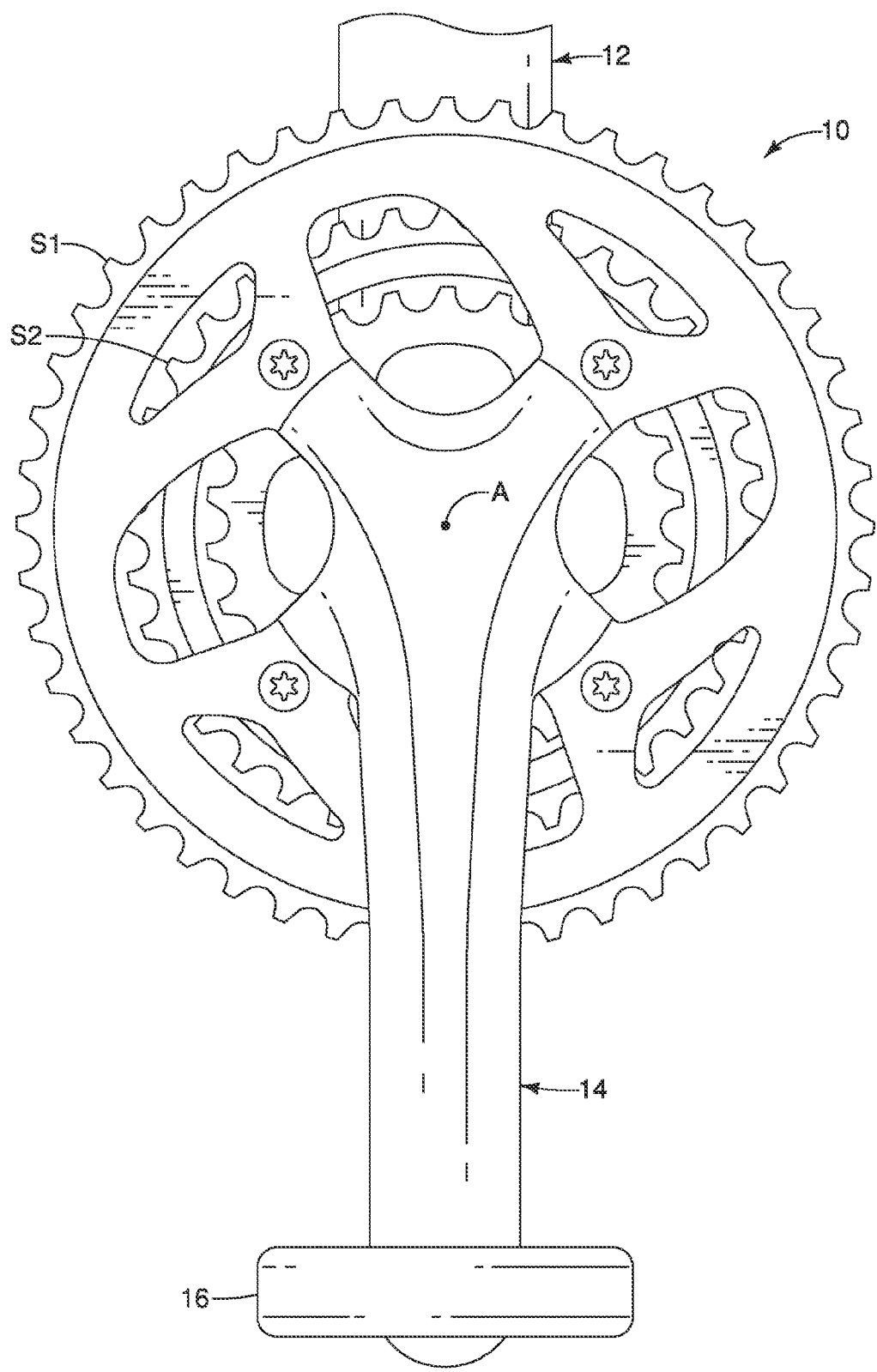
FIG. 1 is a side elevational view of left and right crank arms according to one embodiment.

Referring initially to FIG. 1, a crank axle assembly 10 for a bicycle or a bicycle fitting device, or any other suitable device is illustrated. A concept of bicycle is including stationery bicycle. The crank axle assembly 10 has a first (left) crank arm 12 and a second (right) crank arm 14 in accordance with a first embodiment. The free ends of the crank arms 12 and 14 are each provided with a pedal 16. As is understood, user applies a pedaling force on the pedals 16 and then this force may be transmitted to the crank arms 12 and 14 for moving a chain (not shown) to propel the bicycle in a conventional manner or to move a resistance device (such as a wheel) in a bicycle fitting device. As explained hereinafter, the crank axle assembly 10 is provided with an input force converting apparatus 18 that detects a pedaling force to provide information (e.g., power transmitted to the crank axle assembly 10), which can be conveyed to the rider and/or used by various electronic components.

Figure 2:
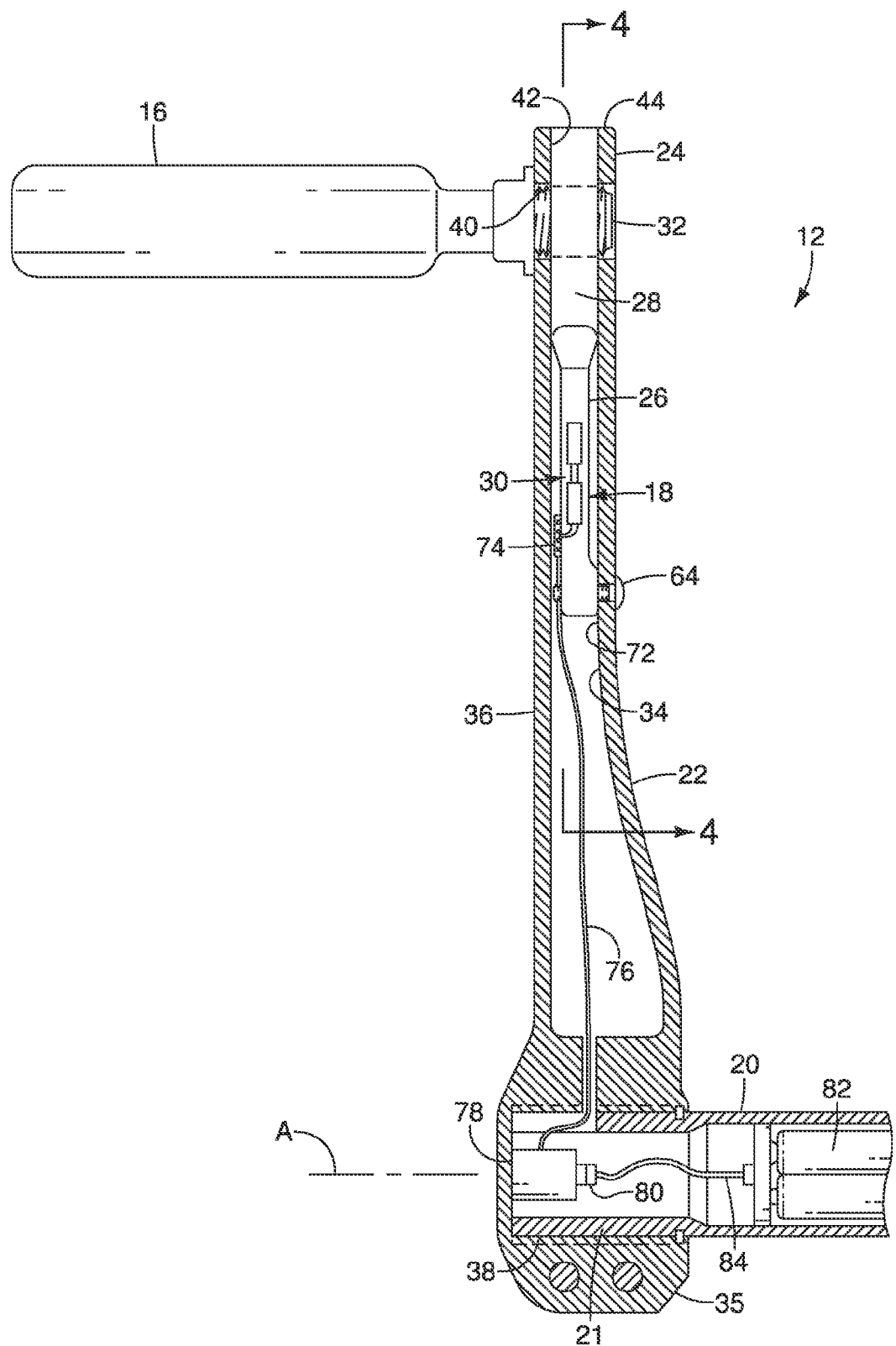
FIG. 2 is a side view in section of a left crank arm in accordance with the crank arms illustrated in FIG. 1.
Figure 3:
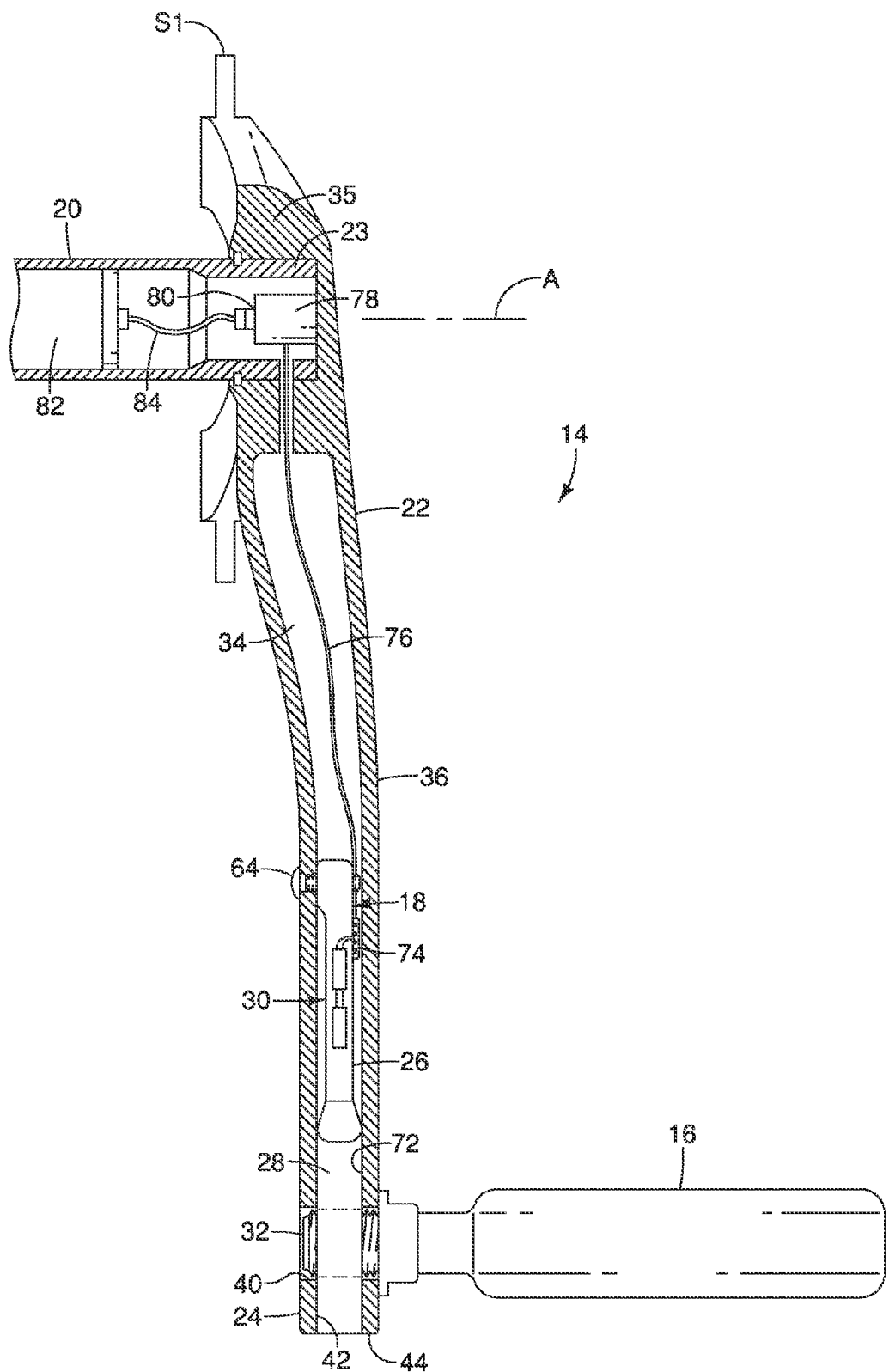
FIG. 3 is a side view in section of a right crank arm in accordance with the crank arms illustrated in FIG. 1.

As illustrated in FIGS. 1-3, the crank axle assembly 10 further includes a crank axle 20. The first and second crank arms 12 and 14 are fixedly coupled to the crank axle 20 such that the first and second crank arms 12 and 14 and extend perpendicularly from the crank axle 20 in opposite directions. In the illustrated embodiment, the first crank arm 12 is attached to a first end 21 of the crank axle 20 in a releasable and reinstallable manner. The second crank arm 14 is attached to a second end 23 of the crank axle 20 in a conventional manner (e.g., press fitting, crimping, locking ring, adhesive, etc.). In the first illustrated embodiment, the second crank arm 14 has a pair of sprockets S1 and S2. The sprockets S1 and S2 are fixedly mounted to the second crank arm 14 in a conventional manner (e.g., ring nuts and ring bolts). As seen in FIGS. 2 and 3, the longitudinal center of the crank axle 20 defines a rotational axis A of the crank axle assembly 10.

Referring now to FIGS. 2 and 3, the first and second crank arms 12 and 14 will now be discussed in more detail. Basically, the first and second crank arms 12 and 14 are each provided with a crank body 22 having an axle mounting portion 24, a sensor support member 26 attached to the crank body 22, the sensor support member 26 having an axle support portion 28 that is configured to support an axle, and at least one strain sensor 30 disposed on the sensor support member 26. As explained hereinafter, the sensor support member 26 and the strain sensor 30 form the input force converting apparatus 18, and the sensor support member 26 mounts the strain sensor 30 to the pedal axel 32 to measure torque or power being applied to the crank arm. The information from the strain sensor 30 then may be used to calculate the effort exerted by the rider and/or used to aid in displaying the power, or operating a component of the bicycle or bicycle fitting device.

More specifically, the first crank arm 12 includes a crank body 22 that has a cavity 34 that receives the sensor support member 26, while the second crank arm 14 includes a crank body 22 that has a cavity 34 that receives another sensor support member 26, such that each sensor support member 26 is disposed within a respective cavity 34 of the crank body 22. The cavity 34 extends to the axle mounting portion 24 of the crank body 22. While the crank bodies 22 have different overall configurations, at least a part of the cavities 34 of the crank bodies 22 are essentially identical in configuration such that the strain sensors 30 are supported within the cavities 34 by the sensor support members 26. Thus, only the first crank arm 12 will be discussed in further detail herein. However, the following description of the mounting of the strain sensor 30 within the cavity 34 by the sensor support member 26 also applies to the second crank arm 14.

As seen in FIGS. 2-6, the sensor support member 26 is disposed in the cavity 34 of the crank body 22, and non-movably attached to the crank body 22. The sensor support member 26 is a stick shaped member that is used to easily and accurately position the strain sensor 30 on the crank body 22 such that strain occurring in the crank body 22 from a pedaling force is transmitted to the strain sensor 30 via the sensor support member 26. Preferably, the sensor support member 26 is non-detachably fixed to the crank body 22 at two longitudinally spaced apart locations of the crank body 22 for ensuring the pedaling force is transmitted to the strain sensor 30 via the sensor support member.

As seen in FIGS. 2-6, the crank body 22 further includes a crank axle mounting portion 35, a pedal mounting portion (i.e., the axle support portion 24) and an arm portion 36. The cavity 34 is formed in the arm portion 36 that is located between the crank axle mounting portion 35 and the pedal mounting portion 24. In the first illustrated embodiment, the crank axle mounting portion 35, the pedal mounting portion 24 and the arm portion 36 are integrally formed as a one-piece, unitary member of a metallic material that is typically used in manufacturing crank arms. However, the crank body 22 can be formed of a non-metallic material such as a fiber reinforced material (e.g., a carbon fiber material) or composite material (e.g., metallic and a carbon fiber material). While the crank body 22 is generally a very rigid member, the crank body 22 undergoes a slight amount of resilient flexing while a rider is pedaling. In other words, the arm portion 36 of the crank body 22 is elastically deformed upon application of a pedaling force being applied to the pedal mounting portion 24 via the pedals 16 while a rider is pedaling. Thus, the crank body 22 is elastically deformable upon application of a pedaling force.

As seen in FIG. 2, the crank axle mounting portion 35 has a splined bore 38. Here, the first crank arm 12 is attached to the crank axle 20 in any conventional manner. For example, the first crank arm 12 can be modified to have a radial slit that extends from the splined bore 38 and use two clamping bolts can be threaded into the end portion of the crank arm to secure the first crank arm 12 to the crank axle 20 in a conventional manner. The pedal mounting portion 24 has a threaded pedal attachment bore 40 for fixedly attaching one of the pedals 16. In the case of a first (left) crank arm 12, the thread of the threaded pedal attachment bore 40 is a left-hand thread for attaching the pedal 16. On the other hand, in the case of a second (right) crank arm 14, a right-hand thread is typically used for attaching the pedal 16. The pedal mounting portion 24 may include a non-threaded bore through which the pedal axel can extend, if desired.

Figure 4:
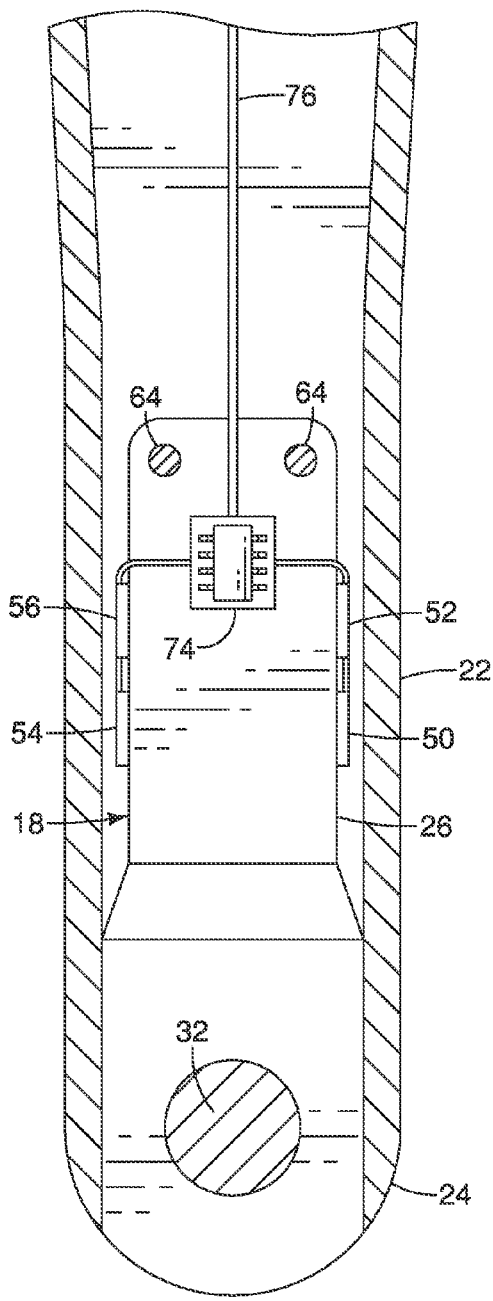
FIG. 4 is a front cross-sectional view of the crank arm illustrated in FIG. 2 taken along line 4-4 showing the sensor support member inside of the cavity of the left crank arm.
Figure 5:
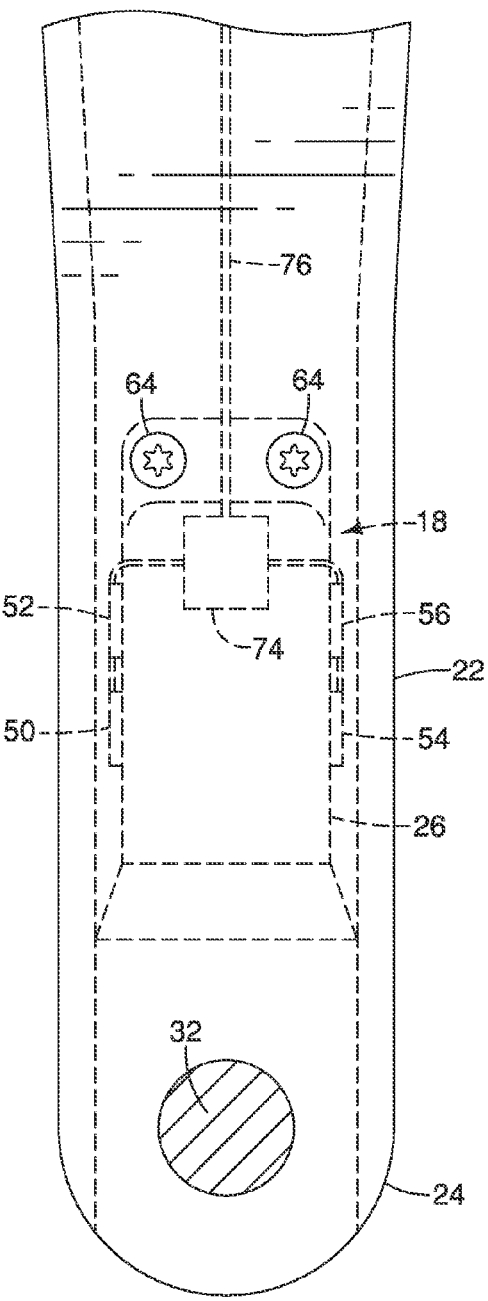
FIG. 5 is a rear cross-sectional view of the crank arm illustrated in FIG. 2 showing the sensor support member inside of the cavity of the left crank arm.
Figure 6:
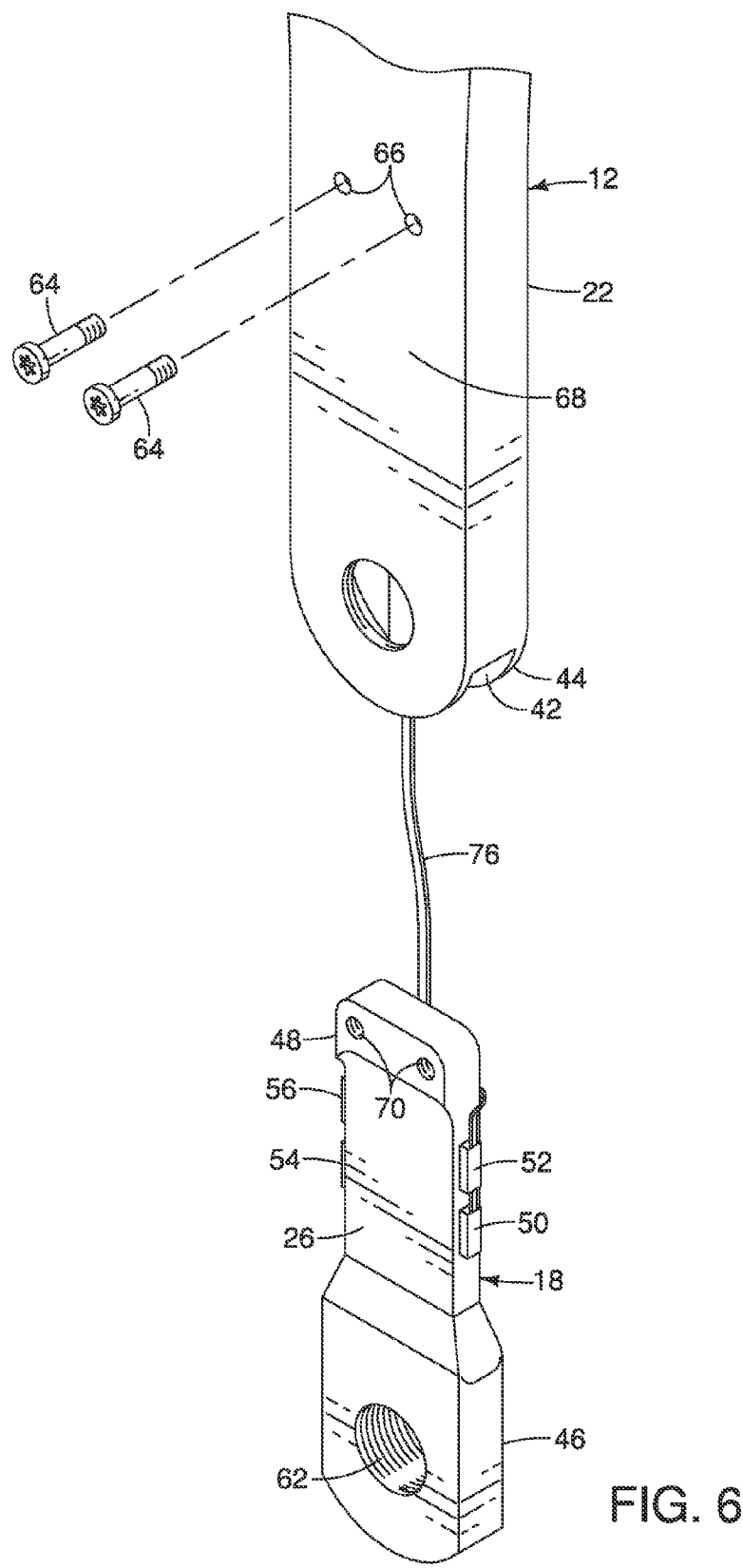
FIG. 6 is a partial exploded view of the crank arm illustrated in FIG. 1.

Referring to FIGS. 4-6, the input force converting apparatus 18 will now be discussed in more detail. While a rider is pedaling the crank assembly 12, the crank body 22 will undergo a slight amount of resilient flexing due to the application of a pedaling force in the direction of rotation and twisted relative to the longitudinal direction of the crank body 22. In other words, when the rider rotates the crank axel assembly, the crank arm will slightly bend based on the pedaling force from the rider. In this way, the arm portion 36 of the crank body 22 will be elastically deformed such that the pedal mounting portion 24 will deflect relative to the crank axle mounting portion 35.

The sensor support member 26 of the input force converting apparatus 18 is configured to deform upon application of a pedaling force being applied to the axel support portion 24. In particular, the sensor support member 26 is mounted to the crank body 22 such that the sensor support member 26 will be elastically deformed with the arm portion 36 of the crank body 22 upon application of a pedaling force being applied to the pedal mounting portion 24. In the first illustrated embodiment, the sensor support member 26 accurately and easily supports the strain sensor 30 within the cavity 34. In particular, as shown in FIG. 6, an end surface 44 of the pedal mounting portion 24 includes an access bore 42 that communicates with the cavity 34 of the crank body 22 for inserting the sensor support member 26 into the cavity 34 of the crank body 22. In this illustrated embodiment, the access bore 42 is disposed on an end surface of the crank body, and more particularly is formed in the pedal mounting portion 24. However, the access bore 42 can be formed in an end surface of the crank axle mounting portion 35, if desired. In either case, the access bore 42 is dimensioned with respect to the sensor support member 26 such that the sensor support member 26 is installed into the cavity 34 via the access bore 42.

As illustrated in FIGS. 4-9, in the first illustrated embodiment, the sensor support member 26 has a first end part 46 and a second end part 48. The strain sensor 30 is supported on the second end part 48 of the sensor support member 26. In this embodiment, the strain sensor 30 includes a plurality of (e.g., four) sensor elements 50, 52, 54 and 56 disposed at different locations on the sensor support member 26. For example, the sensor elements 50, 52, 54 and 56 may be arranged on side surfaces 58 and 60 of the sensor support member 26, and are preferably formed of at least one of a strain gauge and semiconductor sensor for detection of strain.

The first end part 46, which corresponds to the axel support portion 24 is in contact with the crank body 22 at a first location, which corresponds to a section of the access bore 42 at the cavity 34. The sensor support member 26 is fixedly attached to the crank body 22 such that the sensor support member 26 is either press-fitted or bonded to the crank body 22. Additionally, the axle support portion 28 is configured to support a pedal axle 32, and is configured to be fixedly coupled to the pedal axle 32. The axle support portion 28 of the sensor support member 26 includes a threaded hole 62, which may be disposed on the first end part 46 of the sensor support member 26. The pedal attachment bore 40 of the crank body 22 is concentrically arranged relative to the threaded hole 62 of the sensor support member 26, and the pedal axle 32 is configured to be disposed through the pedal attachment bore 40 and engaged with the pedal attachment bore 40.

The second end part 48 of the sensor support member is in contact with the crank body 22 at a second location, and is fixedly coupled to the crank body 22. As shown in FIG. 6, the second end part 48 of the sensor support member 26 is fixedly coupled to the crank body 22 by a bolt 64 or a plurality of bolts 64. That is, bolts 64 extend through openings 66 in the outer surface 68 of the crank arm and enter threaded openings 70 in the strain support member 26. However, the second end part 48 may be fixed to the crank body 22 in any manner desired. The openings 66 are disposed on the inner surface of the crank body 22 when the crank axle assembly 10 is attached to bicycle frame. Moreover, in this embodiment, the openings 66 are disposed on the pedal mounting portion side of a line drawn through the center of the longitudinal direction of the crank arm 12.

With this arrangement, the strain sensor 30 is supported in the cavity 34 in a middle area of the crank arm and the first and second end parts 46 and 48 are located at differing portions within the cavity 34. Moreover, in this embodiment, the strain sensor 30 is disposed on the pedal mounting portion side of a line drawn through the center of the longitudinal direction of the crank arm 12. Preferably, in this embodiment, the first end part 46 tightly contacts the internal surface of the cavity 34 at the pedal mounting portion 24, and is fixed within the cavity 34 by using the threaded connection with the pedal 16 and/or an adhesive bond therebetween an to ensure transfer of the pedaling force from the crank body 22 is properly transmitted to the strain sensor 30 via the sensor support member.

The second end part 48 tightly contacts the internal surface of the cavity 34 to ensure transfer of the pedaling force from the crank body 22 to the second end part 48. The second end part 48 preferably includes a rectangular section that receives electrical wire(s) and/or a flexible print circuit (flexible print board) 76. Preferably, as mentioned above, the second end part 48 tightly contacts the internal surface of the cavity 34, and is fixed within the cavity 34 by using bolts 64 and/or an adhesive bond therebetween and/or a press connection therebetween to ensure transfer of the pedaling force from the crank body 22 is properly transmitted to the strain sensor 30 via the sensor support member.

Figure 7:
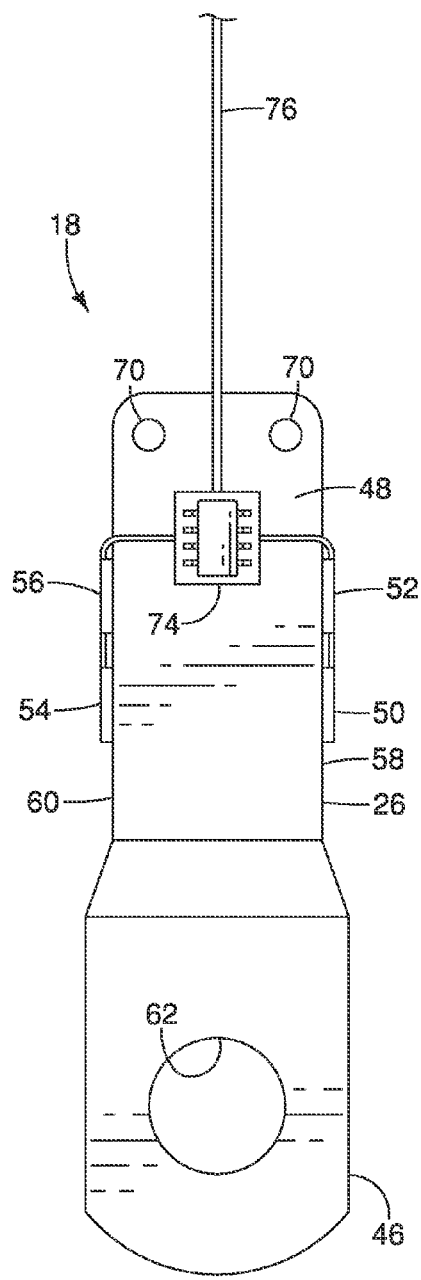
FIG. 7 is an elevational front view of the sensor support member shown in FIG. 4.
Figure 8:
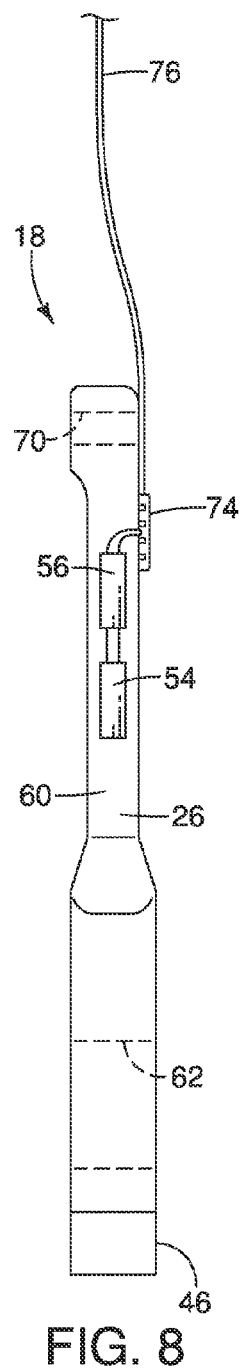
FIG. 8 is a left side view of the sensor support member shown in FIG. 7.
Figure 9:
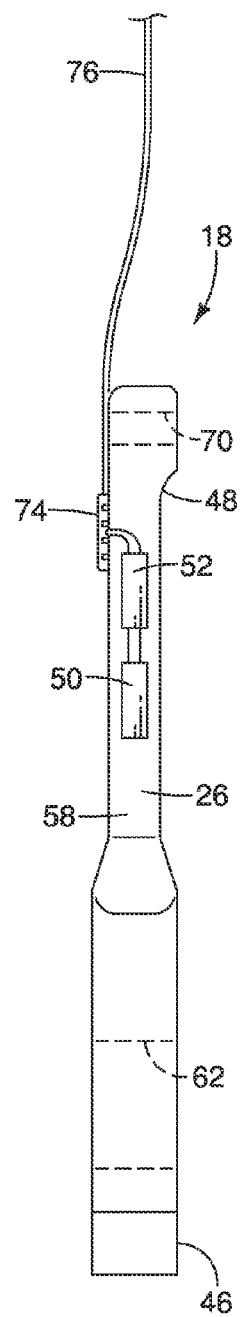
FIG. 9 is a right side view of the sensor support member shown in FIG. 8.

In other words, to aid in the assembly of the sensor support member 26 into the crank body 22, the second end part 48 has a maximum width that is equal to or less than a maximum width of the first end part 46 of the sensor support member 26. In this embodiment, as shown in FIGS. 7-9 the second end part 48 tapers inwardly such that it has a rectangular cross-sectional area that is smaller than the rectangular cross-sectional area of the first end part 46. Additionally, the first end part 46 has a maximum width that is equal to or less than a maximum width of the access bore 42 such that the first end part 46 is snugly received in the cavity 34. In this way, the second end part 48 can easily pass through the access bore 42 during insertion of the sensor support member 26 into the crank body 22 via the access bore 42.

In this embodiment, the four sensor elements 50, 52, 54 and 56 of the strain sensor 30 are disposed at different angular locations with respect to a longitudinal axis of the crank body 22. Preferably, as seen in FIGS. 7-9, the second end part 48 of the sensor support member 26 has a rectangular cross section with respect to the longitudinal axis of the crank body 22. Thus, the second end part 48 of the sensor support member 26 defines two side surfaces 58 and 60 with two of the sensor elements 50, 52, 54 and 56 being arranged on each of the side surfaces 58 and 60 of the sensor support member. The sensor elements 50, 52, 54 and 56 are arranged on opposite side surfaces 58 and 60 of the second end part 48 that are perpendicular to the rotational axis A of the first crank arm 12. The detection directions of the four sensor elements 50, 52, 54 and 56 extend in the longitudinal direction of the first crank arm 12.

While the strain sensor 30 includes four sensor elements 50, 52, 54 and 56, the strain sensor 30 can be constructed with only two of the sensor elements (e.g., 50 and 54) such that one sensor element is arranged on each of the two of the side surfaces 58 and 60 of the second end part 48 of the sensor support member. The sensor elements 50, 52, 54 and 56 are formed of at least one of a strain sensor 30 and semiconductor sensor for detection of strain in the crank arm.

As shown in FIGS. 7-9, an electric amplifier 74 is disposed on the second end part 48 of the sensor support member 26 and operatively connected to the strain sensor 30 to amplify a signal from the strain sensor 30. In this embodiment, the electric amplifier 74 is electrically connected to the strain sensor 30 via at least one of an electric wire 76. The amplifier 74 enables the strain sensor 30 to achieve a high gain and simultaneously achieve low power, low thermal drift and low noise. For example of a strain amplifier, see WO 2009/006673, the entire contents of which are herein incorporated by reference.

As seen in FIGS. 2 and 3, in the first embodiment, each of the first and second crank arms 12 and 14 further includes a communication unit 78. It will be apparent from this disclosure that the communication units 78 can be combined into a single communication unit that is mounted on either one of the crank arms 12 and 14 or the crank axle 20 as needed and/or desired. The communication units 78 each have an electrical connector 80. The crank axle assembly 10 further includes a battery unit 82 that is mounted within the interior of the crank axle 20. The battery unit 82 has a pair of electrical connectors 80 that mate with the electrical connectors 80 of the communication units 78.

The communication units 78 are electrically connected to the strain sensors 30 in a conventional manner using electrical conductors 84, which can be for example electrical wires or flexible electrical conductor boards. The battery unit 82 supplies electrical power to the communication units 78. The strain sensors 30 of the first and second crank arms 14 and 16 are operatively connected to the communication units 78 via the electrical conductors 84 to receive signals from the strain sensors 30. Based on signals from the strain sensors 30, the communication units 78 output information to various bicycle components as needed and/or desired. While the communication units 78 are mounted to the crank arms, they can be located elsewhere. For example, when the crank body 22 is made by a metallic material, the communication units 78 are preferably disposed outside of or on the crank body 22. Also while the battery unit 82 is disposed in the hollow interior of the crank axle 20, in the illustrated embodiment, the battery unit 82 can be located elsewhere.

Preferably, each of the communication units 78 includes a microprocessor and a transmitter so that the communication units 78 wirelessly transmit information to one or more electrical bicycle components such as the cycle computer, the electronic front derailleur and the electronic rear derailleur. Alternatively, the communication units 78 can be operatively connected to one or more of the cycle computer, the electronic front derailleur and the electronic rear derailleur by one or more electrical cords.

Figure 10:
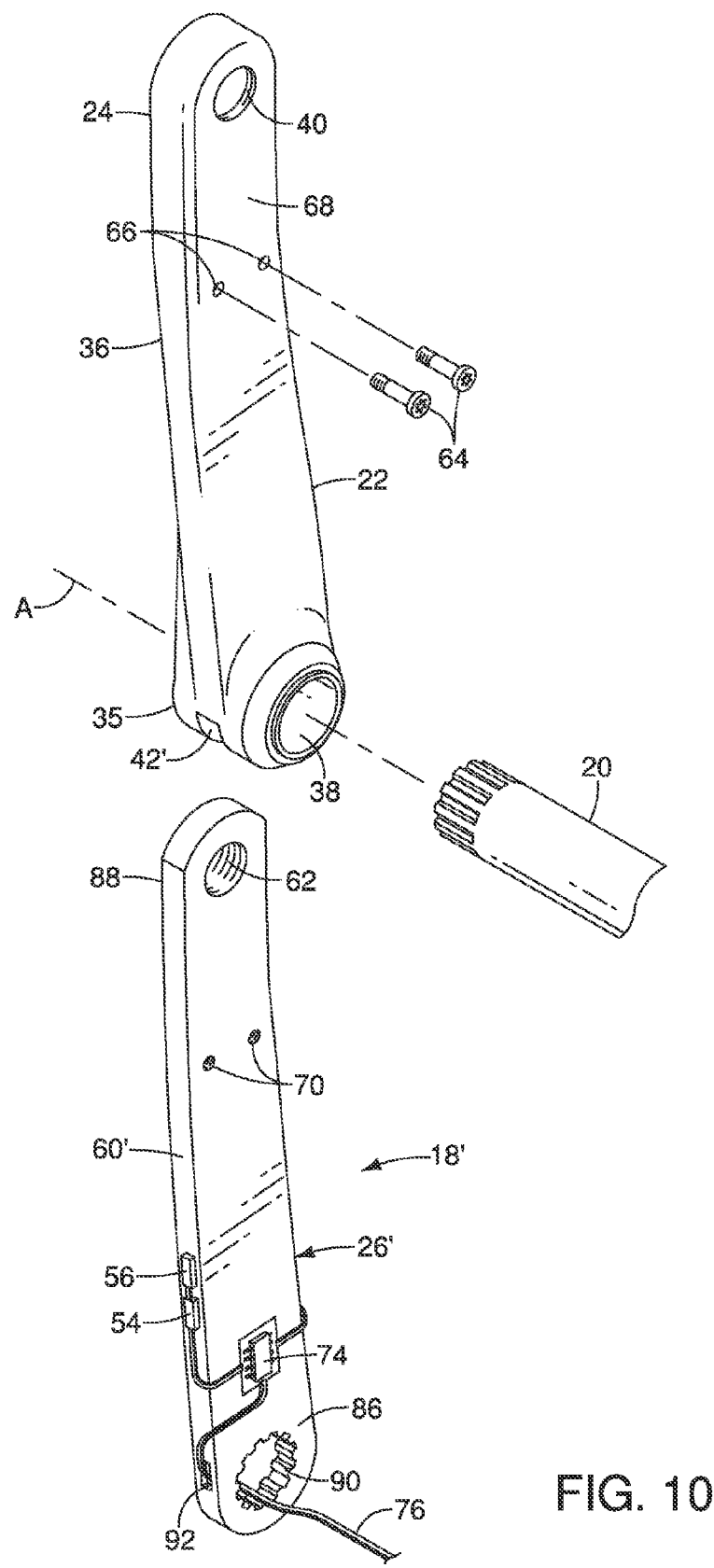
FIG. 10 is an exploded perspective view of a crank arm according to another embodiment.
Figure 11:
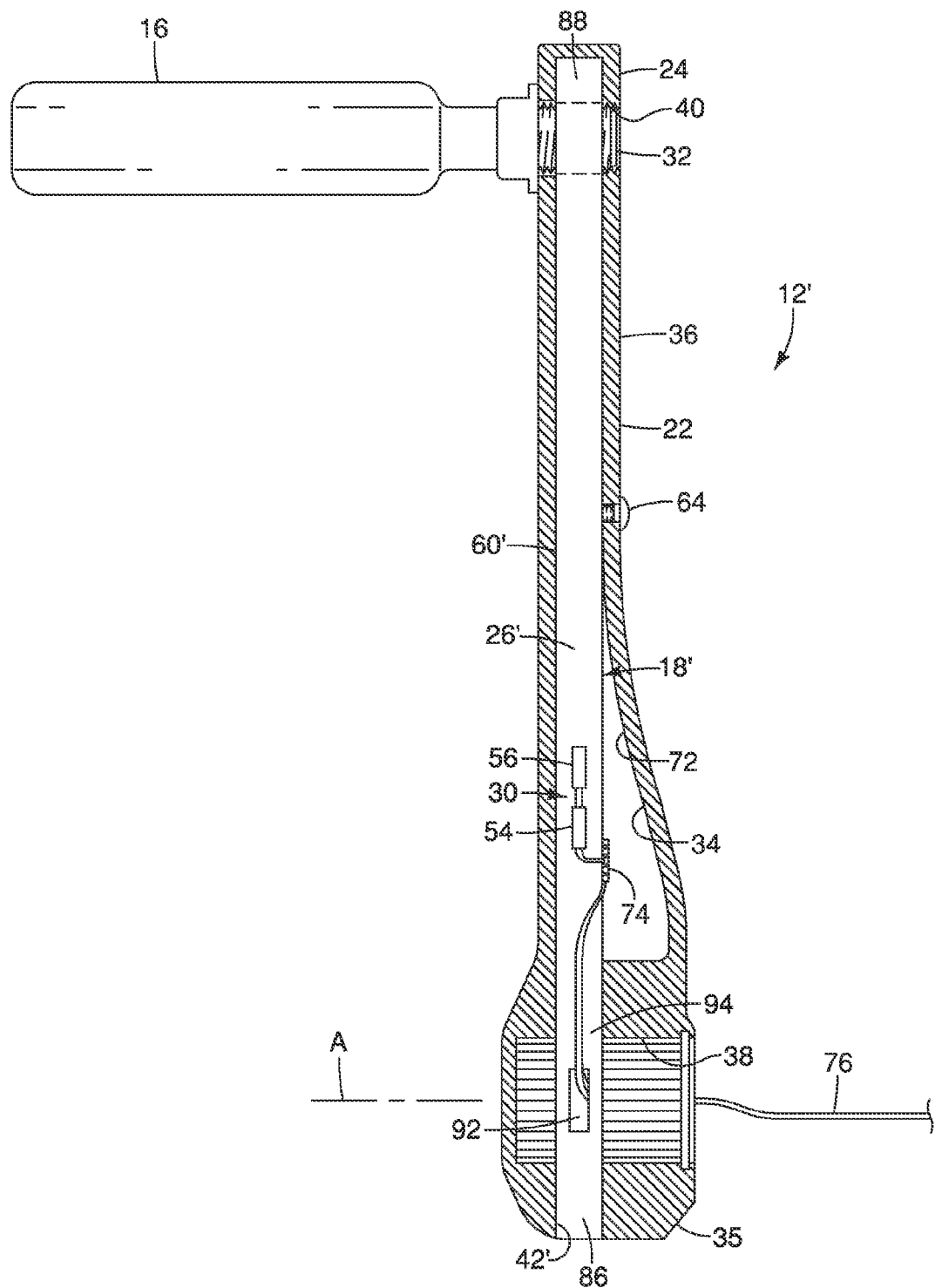
FIG. 11 is side view in section of the crank arm illustrated in FIG. 10.

A second embodiment of the present invention showing first crank arm 12' is illustrated in FIGS. 10 and 11. In this embodiment, the input force converting apparatus 18' includes a sensor support member 26' with a first axle support portion 86 and a second axel support portion 88. In this embodiment, the first axle support portion 86 of the sensor support member 26' is configured to support a crank axle 20 as the axle. Moreover, the second axel support portion 88 of the sensor support member 26' is configured to support the pedal axel 32. Accordingly, and the second axel support portion 88 is configured to support a pedal axle as the axle, and the first axel support portion is further configured to support the crank axle 20 as another axle, as shown in FIG. 11. However, if desired, the sensor support member 26' may be attached to the crank axel at a first end and to the inside of the crank arm using bolts 64 at another portion (such as a second end). That is, the support member 26' does not necessarily need to support both the crank axel and the pedal axel.

As illustrated in FIGS. 10 and 11, similarly to as discussed above, the crank axle mounting portion 35 of the crank body 22 has a splined bore 38. In this embodiment, first axel support portion 86 also has a splined bore 90 that substantially matches the crank axle mounting portion splined bore 38. Additionally, the first crank arm 12' may attached to the crank axle 20 using a locking ring. However, the first crank arm 12' can be attached to the crank axle 20 in any conventional manner. The pedal mounting portion 24 has a threaded pedal attachment bore 40 for fixedly attaching one of the pedals 16. Thus, in this embodiment, the sensor support member 26' is fixed inside the cavity 34 of the crank arm at at least two positions by the crank axel 20 and the pedal axel 32. Moreover, if desired the strain support member 26' can be attached to the crank arm 12' using bolts 64, as discussed above.

The first crank arm 12' in this embodiment includes an access bore 42' in the end of the crank arm adjacent the crank arm. As with the access bore 42 discussed above, this access bore 42' enables the sensor support member 26' to be inserted into the cavity 34 in the crank arm. Although the access bore 42' is shown in FIGS. 10 and 11 as being in the end adjacent the crank arm, the access bore 42 may be in the end adjacent the pedal axel 32 or in an access bore 42 may be in both ends, if desired.

As shown in FIG. 10, the sensor support member 26' has a rounded ends in a similar manner as the crank arm. Moreover, the electrical wires that connect the flexible strain board to the strain sensors 30 extends through the splined bore 90 in the strain support member and through openings 92 in the side 60' of the strain support member 26'. This structure enables the flexible strain board with the amplifier to extend through the splined bore 90 and into the crank axel 20.

Thus, as is understood the sensor support member 26' is fixed to the crank arm in two positions. The sensor support member 26' is fixed in the first position by the crank axel 20 engaging the splined bore 90 and the second position by the pedal axel 32 threads engaging the threaded hole 62 and/or the bolts 64 engaging the threaded openings 70. Moreover, the sensor support member 26' may fixed to the crank arm in any manner desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "front", "rear", "side", "horizontal", and "perpendicular" as well as any other similar directional terms refer to those directions of a bicycle in an upright, riding position and equipped with the chain tensioning device. Accordingly, these directional terms, as utilized to describe the chain tensioning device should be interpreted relative to a bicycle in an upright riding position on a horizontal surface and that is equipped with the crank arm. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "connected", "coupled", "mounted", "bonded", "fixed" and their derivatives. Finally, terms of degree such as "substantially" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the changes do not substantially affect their intended function. Components that are shown directly connected or contacting each other can have intermediate structures disposed between them so long as the changes do not substantially affect their intended function. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A crank arm comprising:
   a crank body having a first outer wall, a second outer wall and a connecting wall disposed between the first and second outer walls, at least one of the first and second outer walls including an axle mounting portion having an axle receiving hole, the first and second outer walls and the connecting wall defining an internal cavity;
   a sensor support member attached to the crank body and disposed within the internal cavity of the crank body, the sensor support member having an axle support portion that aligns with the axle receiving hole and is configured to support an axle; and
   at least one strain sensor disposed on the sensor support member.

2. The crank arm according to claim 1, wherein the axle support portion is configured to support a pedal axle as the axle.

3. The crank arm according to claim 2, wherein the axle support portion is configured to further support a crank axle as another axle.

4. The crank arm according to claim 1, wherein the axle support portion is configured to be fixedly coupled to the axle.

5. The crank arm according to claim 1, wherein the axle support portion of the sensor support member includes a threaded hole.

6. The crank arm according to claim 5, wherein the threaded hole is disposed on a first end part of the sensor support member.

7. The crank arm according to claim 5, wherein the crank body has a pedal attachment bore through which a pedal axle is configured to be disposed as the axle.

8. The crank arm according to claim 7, wherein the pedal attachment bore of the crank body is concentrically arranged relative to the threaded hole of the sensor support member.

9. The crank arm according to claim 1, wherein the sensor support member is configured to deform upon a pedaling force being applied to the axle support portion.

10. The crank arm according to claim 1, wherein the sensor support member is fixedly attached to the crank body such that the sensor support member is either press-fitted or bonded to the crank body.

11. The crank arm according to claim 1, wherein the crank body has an access bore that communicates with the internal cavity of the crank body, the access bore being dimensioned with respect to the sensor support member such that the sensor support member is installed into the internal cavity via the access bore.

12. The crank arm according to claim 11, wherein the access bore is disposed on an end surface of the crank body.

13. The crank arm according to claim 12, wherein the sensor support member extends to the axle mounting portion of the crank body.

14. The crank arm according to claim 11, wherein the connecting wall of the crank body has the access bore.

15. The crank arm according to claim 1, wherein the sensor support member has first and second end parts, the axle support portion being disposed on the first end part of the sensor support member, the second end part of the sensor support member being fixedly coupled to the crank body.

16. The crank arm according to claim 15, wherein the second end part of the sensor support member is fixedly coupled to the crank body by a bolt.

17. The crank arm according to claim 1, wherein the strain sensor includes a plurality of sensor elements disposed at different locations on the sensor. support member.

18. The crank arm according to claim 17, wherein the sensor elements are arranged on side surfaces of the sensor support member.

19. The crank arm according to claim 17, wherein the sensor elements are formed of at least one of a strain gauge and semiconductor sensor for detection of strain.

20. The crank arm according to claim 1, further comprising an electric amplifier disposed on the sensor support member and operatively connected to the strain sensor to amplify a signal from the strain sensor 30.

21. The crank arm according to claim 20, wherein the electric amplifier is electrically connected to the strain sensor via at least one of an electric wire and a flexible print circuit.

22. The crank arm according to claim 1, wherein the axle support portion is configured to support a crank axle as the axle.

* * * * *